United States Patent [19]

Audeh et al.

[11] Patent Number: 5,120,515
[45] Date of Patent: Jun. 9, 1992

[54] SIMULTANEOUS DEHYDRATION AND REMOVAL OF RESIDUAL IMPURITIES FROM GASEOUS HYDROCARBONS

[75] Inventors: Costandi A. Audeh, Princeton, N.J.; Barry E. Hoffman, Duncanville, Tex.

[73] Assignee: Mobil Oil Corporation, Fairfax, Va.

[21] Appl. No.: 643,617

[22] Filed: Jan. 22, 1991

[51] Int. Cl.⁵ .................. B01D 53/02; B01D 53/14
[52] U.S. Cl. .................................. 423/210; 55/35; 55/75; 423/230
[58] Field of Search ............... 423/210, 230; 55/72, 55/35; 252/194

[56] References Cited

U.S. PATENT DOCUMENTS

| 4,094,777 | 6/1978 | Sugier et al. | 55/72 |
|---|---|---|---|
| 4,251,495 | 2/1981 | Deschamps et al. | 423/230 |
| 4,834,953 | 5/1989 | Audeh | 423/210 |
| 4,874,525 | 10/1989 | Markovs | 423/210 |
| 4,895,708 | 1/1990 | Yan | 423/210 |
| 4,902,662 | 2/1990 | Toulhoat et al. | 55/72 |
| 4,982,050 | 1/1991 | Gammie et al. | 55/69 |
| 4,983,277 | 1/1991 | Audeh et al. | 423/210 |

*Primary Examiner*—John Niebling
*Assistant Examiner*—Brian M. Bolam
*Attorney, Agent, or Firm*—A. J. McKillop; C. J. Speciale

[57] ABSTRACT

The present invention advantageously provides a conventional dessicant bed with means for removing residual mercury, $H_2S$ and $CO_2$ from a gas, such as a natural gas stream, by replacing an inert protective layer of pellets with an active compound comprising at least one of copper hydroxide, copper oxide and copper sulfide. The active compound provides the dessicant bed with the additional advantage of removing $H_2S$ and $CO_2$ as well as mercury from the gaseous fraction without incurring the pressure loss inherent in utilizing a separate downstream adsorbent bed for removing Hg.

21 Claims, No Drawings

SIMULTANEOUS DEHYDRATION AND REMOVAL OF RESIDUAL IMPURITIES FROM GASEOUS HYDROCARBONS

The present invention is directed to a method for the removal of moisture and contaminants from gases and a novel dessicant bed useful in practicing that method. Specifically, the present invention is directed to a process for removing mercury and hydrogen sulfide from contaminated gases and a dessicant bed for practicing that process which comprises a bed comprising a dessicant and at least one of three types of substrates which have been treated with copper oxide, copper hydroxide, and copper sulfide, respectively. The present invention is particularly useful for removing moisture, mercury, carbon dioxide and hydrogen sulfide from natural gas in a treatment plant prior to liquefaction.

BACKGROUND OF THE INVENTION

Natural gas which is produced from a natural gas well is typically separated and purified to provide products for a variety of end uses. The high-pressure mixture produced from the well, i.e. the wellstream, is typically sent to a separator vessel or a series of separator vessels maintained at progressively lower pressures where the wellstream is separated into a gaseous fraction and a liquid fraction.

The gaseous fraction leaving the separator, which may contain the impurities mercury, carbon dioxide and hydrogen sulfide, is sent to a gas treatment and purification plant where, typically, the mercury concentration is reduced to $<0.1$ micrograms/m$^3$, the $CO_2$ concentration is reduced to the parts per million (ppm) level, and the $H_2S$ to about one (1) ppm.

The purification of the gaseous fraction is commonly achieved by passing the gaseous fraction over a bed of activated carbon which has been impregnated with sulfur. In this step, the mercury in the gas reacts with the sulfur and is essentially removed from the gaseous fraction. Typically, the mercury content of the gas can be reduced from about 250 micrograms/m$^3$ or higher to less than about 0.1 micrograms/m$^3$.

The gas leaving the sulfur/carbon bed then could be treated with a hot aqueous potassium carbonate solution which has the ability to absorb $CO_2$ and $H_2S$. This step produces a natural gas stream having a reduced $CO_2$ and $H_2S$ content. For example, the $CO_2$ content of the gas can be reduced from about 15% to about 0.3% and the $H_2S$ content from about 80 ppm to about 6 ppm.

The natural gas stream which resulted from treatment with the carbonate solution is further treated in order to reduce the amount of $CO_2$ and $H_2S$ by treating the gas with an amine solution, e.g. an aqueous solution of diethanolamine. Diethanolamine has the ability to absorb $CO_2$ and $H_2S$, and can typically reduce the $CO_2$ content from about 0.3% to about 50 ppm, and the $H_2S$ content from about 6 ppm to about 1 ppm. The natural gas is then washed with water to remove traces of entrained amine. This water wash, however, neither removes residual mercury, typically present in levels of less than 0.1 $\mu g/Nm^3$, nor residual $H_2S$ and $CO_2$, typically about 1 ppmv and 50 ppmv, respectively.

The washed natural gas is water-saturated and has to be dried prior to liquefaction. Usually drying is achieved by contacting the wet gas with a desiccant in a packed bed specifically designed for this purpose. The desiccant bed undergoes repeated cycles of adsorption and regeneration. To ensure that the desiccant bed retains its integrity during the drying and regeneration cycles, a protective layer of inert alumina spheres having a depth of about 1–2 ft., and which are somewhat larger than the desiccant particles, is placed over the desiccant.

The dried gas, which still contains small amounts of mercury, $CO_2$ and $H_2S$, can be further purified by contacting it with an adsorbent bed comprising sulfur on carbon, which has the ability to selectively remove mercury from the gas. Usually such an adsorbent can reduce the mercury concentration to less than 0.006 $\mu g/Nm^3$, however, including such an additional bed causes a pressure drop in the system. A pressure drop in a system in which an elevated pressure is required for the maximum efficiency of a process is not desirable.

Although the Hg content of the gas is reduced by the use of this additional adsorbent bed, its $H_2S$ and $CO_2$ content remain unchanged at about 1 and 50 ppmv respectively. In a liquefaction process, the temperature required to liquefy methane is 109° K., i.e. $-164°$ C., which is well below the freezing point of $CO_2$. Thus, in time, $CO_2$ can accumulate in the cold parts of a liquefaction train and can cause plugging, an undesirable condition. Although $H_2S$ is present in lesser amounts than the $CO_2$, its freezing point, 187° K., i.e. $-86°$ C., is also well above the 109° K., which means that any $H_2S$ in the gas will become a solid at the conditions of the liquefaction process which can add to the plugging problem.

It would be beneficial to provide a mechanism for further reducing the levels of residual mercury from the gas leaving the desiccant bed without a consequential pressure reduction which typically accompanies use of a second adsorbent bed. It would also be very desirable to remove $CO_2$ and $H_2S$ from that gas to reduce the risk of plugging.

SUMMARY OF THE INVENTION

The present invention advantageously provides a conventional desiccant bed with means for removing residual mercury, $H_2S$ and $CO_2$ from a gas, such as a natural gas stream, by providing an inert protective layer, e.g. of alumina pellets, with an active compound having at least one of copper hydroxide, copper oxide and copper sulfide. The active compound provides the desiccant bed with the additional advantage of removing $H_2S$ and $CO_2$ as well as mercury from the gaseous fraction without incurring the pressure loss inherent in utilizing a separate downstream adsorbent bed for removing Hg.

DETAILED DESCRIPTION

It has been found that alumina impregnated with copper hydroxide or with copper oxide reacts with hydrogen sulfide to form copper sulfide. It has also been found that copper sulfide can be used to remove mercury from natural gas. In addition, $CO_2$ can react with copper oxide and copper hydroxide at relatively high pressures to form copper carbonate. Copper carbonate is thermally unstable and decomposes at 200° C. to give off $CO_2$.

The present invention utilizes these mechanisms in providing an improved gas purification procedure for the removal of mercury from natural gas. Specifically, the present invention takes advantage of the ability of copper oxide and copper hydroxide to react with hydrogen sulfide and carbon dioxide, the ability of copper carbonate to thermally decompose at about 220° C., the ability of copper sulfide to remove mercury from a gaseous stream, and the ability to regenerate copper sulfide used to remove the mercury from the gas stream at the temperature of desiccant regeneration.

According to one embodiment of the present invention, the protective layer of inert alumina pellets or spheres, which are usually placed on top of a dessicant bed to ensure that the dessicant bed retains its integrity during drying and regeneration, are replaced with alumina pellets or spheres which have been individually impregnated with at least one of copper hydroxide, copper oxide, or copper sulfide.

While alumina in the form of pellets is a preferred substrate of the present invention, other substrates may also be utilized including silica, silica-alumina, molecular sieves, silica gels, and combinations thereof. The dessicant of the present invention may comprise any solids which have the ability to adsorb water and release it upon heating to regenerate the dessicant, as well as to withstand the regeneration temperatures described below, may be utilized.

These reactive substances, namely the copper hydroxide, copper oxide, and copper sulfide are most preferably impregnated into separate pellets. Thus, some of the pellets will be treated with copper hydroxide while others will be treated wit copper oxide, and still others will be treated with copper sulfide. While it is preferred that the entire protective layer of alumina pellets is treated with one of these reactive substances, some of the pellets may be left untreated leaving some inert pellets in the protective layer.

Any known method for impregnating the porous substrate with these active compounds may be utilized. For example, the copper hydroxide impregnated alumina pellets may be prepared by thoroughly mixing 30 parts by weight of alumina (dry basis) with 8 parts copper hydroxide and 62 parts of deionized water, extruding the mixture through a ¼ inch dieplate and drying at 120° C. The copper oxide impregnated pellets may be prepared by heating the copper hydroxide impregnated pellets to 400° C. The copper sulfide impregnated pellets may be prepared by reacting the copper hydroxide impregnated pellets with gaseous hydrogen sulfide. The present invention is not limited by the manner in which the active compounds are impregnated onto a substrate.

When copper oxide is added to a substrate, it is preferably added in an amount of about 10-20% by weight of said substrate, most preferably about 12-18%. Similarly, copper hydroxide is preferably added in an amount of about 10-30% by weight based on the weight of the substrate, and most preferably in an amount of about 15-20% by weight. Lastly, when copper sulfide is utilized, it is preferably added in an amount of 10-20% by weight of the substrate, most preferably in an amount of about 12-18% by weight.

While the active compounds of the present invention are preferably impregnated into a porous substrate, these compounds may be dispersed on a non-porous substrate or may even be formed into hardened pellets themselves and placed on top of the dessicant bed. Suitable porous substrates include alumina, silica-alumina, silica gel, molecular sieves and other porous substrates known in the art. Those skilled in the art will also appreciate that certain porous substrates will also provide the added advantage of having the ability to absorb some moisture from the moisture-containing gas thereby supplementing the dehydration performed by the dessicant.

According to one preferred embodiment of the present invention, the ratio of each type of pellet, in other words the ratio of pellets treated with copper hydroxide to the number treated with copper oxide to the number treated with copper sulfide is about 1:1:1. However, other ratios are possible without departing from the scope of the present invention.

Copper sulfide has the ability to remove mercury from natural gas to about the same purity level as other mercury removal materials while allowing the adsorbed mercury to be stripped off during the desiccant regeneration cycle (heating with a gas sweep to about 500°-700° F.). Hence, the copper sulfide is periodically and simultaneously regenerated with the desiccant. Thus, in addition to supplying integrity to the desiccant bed, the CuS-impregnated alumina spheres remove mercury from the gas, without the requirement for an additional specially designed adsorbent bed with its additional inherent pressure drop. The copper hydroxide and copper oxide not only have the ability to react with $CO_2$ and $H_2S$ and remove them from the gas, but by forming copper sulfide, also assist in reducing the level of mercury in the gas.

The present invention advantageously does not require substantial changes to a conventional gas treatment process. The benefits of the present invention may be obtained while supplying the contaminated, moisture-containing natural gas into the dessicant bed at a pressure of about 1-100 atmospheres, at a temperature of about 60°-110° F. and at a space velocity of about 1-300. Most preferably, the contaminated, moisture containing gas is fed into the dessicant bed at a pressure of about 20-60 atmospheres, a temperature of about 50°-120° F., and at a space velocity of about 100-200. Those skilled in the art will appreciate that the space velocity is defined as the volume of gas passing through the dessicant bed every hour divided by the volume of the dessicant bed. As used herein, the volume of the dessicant bed is considered to be the sum of the volume of the dessicant and the total volume of pellets whether treated with one of the above mentioned active compounds or untreated and left in an inert state.

As mentioned above, the dessicant bed is advantageously regenerated by passing a gas such as methane, ethane or propane, through the dessicant bed at a temperature of about 400°-700° F., most preferably at a temperature of about 600° F. This regeneration step advantageously decomposes accumulated copper carbonate into carbon dioxide and copper oxide. The carbon dioxide is advantageously carried away with the regenerating gas while the copper oxide remains in the alumina pellets for future use in removing contaminants from the natural gas.

While the preferred use of the present invention is in a natural gas purification plant, the dessicant bed of the present invention may also be utilized in the treatment of other gases such as hydrogen, ethylene, etc.

What is claimed is:

1. A process for the simultaneous removal of mercury and moisture in a single desiccant bed from a gas comprising the steps of:

forming said dessicant bed comprising a dessicant and a first substrate impregnated with copper oxide, a second porous substrate impregnated with copper hydroxide and a third porous substrate impregnated with copper sulfide; and contacting said gas with said dessicant bed at a pressure and temperature sufficient to reduce the level of mercury and water from said gas.

2. A process according to claim 1 wherein said dessicant is selected from the group consisting of silica gel, molecular sieves, and combinations thereof.

3. A process according to claim 1 wherein said porous substrates comprise alumina.

4. A process according to claim 1 wherein said first porous substrate comprises alumina and said copper oxide is present in an amount of about 10-20% by weight of said alumina.

5. A process according to claim 1 wherein said second porous substrate comprises alumina and said copper hydroxide is present in an amount of about 10-30% by weight of said alumina.

6. A process according to claim 1 wherein said third porous substrate comprises alumina and said copper sulfide is present in an amount of about 10-20% by weight of said alumina.

7. A process according to claim 1 wherein said impregnated substrate forms a protective layer disposed above said dessicant.

8. A process according to claim 1 wherein said first porous substrate comprises alumina and said copper oxide is present in an amount of about 12-18% by weight of said alumina;
said second porous substrate comprises alumina and said copper hydroxide is present in an amount of about 15-20% by weight of said alumina;
and said third porous substrate comprises alumina and said copper sulfide is present in an amount of about 12-18% by weight of said alumina.

9. A process according to claim 1 further comprising the step of regenerating said dessicant bed at a temperature of about 400°-700° F.

10. A process according to claim 1 further comprising the step of regenerating said bed at a temperature of at least about 600° F.

11. A process for purifying natural gas comprising the steps of:
purifying said gaseous fraction with a solution which has the ability to absorb carbon dioxide and hydrogen sulfide contained in the gas;
washing said purified gas with water to remove entrained absorbent solution and provide a substantially absorbent solution-free stream;
contacting said stream with a said dessicant bed comprising a dessicant and a first substrate treated with copper oxide, a second substrate treated with copper hydroxide, and a third substrate treated with copper sulfide to simultaneously remove moisture and impurities from said stream.

12. A process according to claim 11 wherein said purifying solution comprises a carbonate.

13. A process according to claim 12 wherein said purifying solution is subsequently washed with diethanolamine.

14. A process according to claim 11 wherein said dessicant is selected from the group consisting of silica gel, molecular sieves, and combinations thereof.

15. A process according to claim 11 wherein said porous substrate comprise alumina.

16. A process according to claim 11 wherein said substrate comprises at least two of the group consisting of said first porous substrate, said second porous substrate and said third porous substrate.

17. A process according to claim 16 wherein said first porous substrate comprises alumina and said copper oxide is present in an amount of about 10-20% by weight of said alumina.

18. A process according to claim 16 wherein said second porous substrate comprises alumina and said copper hydroxide is present in an amount of about 10-30% by weight of said alumina.

19. A process according to claim 16 wherein said third porous substrate comprises alumina and said copper sulfide is present in an amount of about 10-20% by weight of said alumina.

20. A process according to claim 16 wherein said porous substrates form a protective layer disposed above said dessicant.

21. A process according to claim 11 wherein said dessicant bed comprises said first porous substrate, said second porous substrate and said third porous substrate;
said first porous substrate comprises alumina and said copper oxide is present in an amount of about 12-18% by weight of said alumina;
said second porous substrate comprises alumina and said copper hydroxide is present in an amount of about 15-20% by weight of said alumina;
and said third porous substrate comprises alumina and said copper sulfide is present in an amount of about 12-18% by weight of said alumina.

* * * * *